(12) United States Patent
Miller et al.

(10) Patent No.: US 9,573,494 B2
(45) Date of Patent: *Feb. 21, 2017

(54) EASY-ENTRY SEAT-BACK RELEASE SYSTEM FOR VEHICLE SEAT

(71) Applicant: Faurecia Automotive Seating, LLC, Auburn Hills, MI (US)

(72) Inventors: Gregory Miller, Oxford, MI (US); Michael Miller, South Lyon, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/203,113

(22) Filed: Mar. 10, 2014

(65) Prior Publication Data
US 2014/0239695 A1 Aug. 28, 2014

Related U.S. Application Data

(63) Continuation of application No. 13/229,555, filed on Sep. 9, 2011, now Pat. No. 8,690,251.

(60) Provisional application No. 61/381,638, filed on Sep. 10, 2010.

(51) Int. Cl.
*B60N 2/235* (2006.01)
*B60N 2/20* (2006.01)

(52) U.S. Cl.
CPC ............ *B60N 2/2352* (2013.01); *B60N 2/20* (2013.01); *B60N 2/2356* (2013.01)

(58) Field of Classification Search
USPC ........................................ 297/378.12, 378.14
See application file for complete search history.

(56) References Cited

U.S. PATENT DOCUMENTS

| | | | |
|---|---|---|---|
| 3,794,380 A | 2/1974 | Mertz | |
| 5,718,481 A * | 2/1998 | Robinson | B60N 2/2354 297/367 R |
| 6,464,299 B1 | 10/2002 | Castagna | |
| 6,554,362 B1 | 4/2003 | Pospeshil | |
| 6,663,180 B2 | 12/2003 | LeTournoux | |
| 6,685,270 B2 | 2/2004 | Haglund | |
| 6,926,362 B2 | 8/2005 | Kroner et al. | |
| 6,986,551 B2 * | 1/2006 | Ohba | B60N 2/06 297/341 |
| 7,086,698 B2 | 8/2006 | Shiraki | |
| 7,273,254 B2 | 9/2007 | Fujita et al. | |
| 7,325,874 B2 | 2/2008 | Zhang | |
| 7,328,954 B2 | 2/2008 | Sasaki et al. | |
| 7,364,237 B2 | 4/2008 | Grable et al. | |
| 7,578,556 B2 | 8/2009 | Ohba et al. | |
| 7,661,760 B2 | 2/2010 | Nakaya et al. | |
| 7,686,398 B2 | 3/2010 | Yokoyama | |

(Continued)

OTHER PUBLICATIONS

07-08-50-002B: Third Row Passenger Seat May not Fold Down Flat and/or High Effort to Release Seat Back, Right Rear Seat Latch May not Disengage (Replace Inboard Recliner Latch and Cable)—(Apr. 4, 2008), 6 pages.

*Primary Examiner* — David E Allred
(74) *Attorney, Agent, or Firm* — Reising Ethington P.C.

(57) ABSTRACT

A seatback-motion controller in accordance with the present disclosure is mounted on a vehicle seat in a vehicle. The vehicle seat includes a seat base and a seat back mounted for pivotable movement relative to the seat base between an upright use position and a forward-leaning easy-entry position.

21 Claims, 13 Drawing Sheets

(56) References Cited

U.S. PATENT DOCUMENTS

| | | |
|---|---|---|
| 7,690,728 B2 | 4/2010 | Miyauchi et al. |
| 7,775,598 B2 | 8/2010 | Schmitz et al. |
| 8,038,217 B2 | 10/2011 | Yamagishi et al. |
| 8,544,956 B2 | 10/2013 | Park et al. |
| 8,690,251 B2 | 4/2014 | Miller et al. |
| 2003/0080601 A1 | 5/2003 | Charras et al. |
| 2003/0127898 A1 | 7/2003 | Niimi et al. |
| 2004/0195889 A1 | 10/2004 | Secord |
| 2004/0239169 A1 | 12/2004 | De Nichilo |
| 2005/0046261 A1 | 3/2005 | Grable et al. |
| 2005/0062329 A1 | 3/2005 | Alacqua et al. |
| 2005/0146188 A1 | 7/2005 | Nichilo |
| 2007/0138854 A1 | 6/2007 | Paing et al. |
| 2009/0001797 A1* | 1/2009 | Neumann ............... B60N 2/123 297/378.12 |
| 2009/0218871 A1 | 9/2009 | Wieclawski |
| 2010/0123343 A1 | 5/2010 | Bonk et al. |

\* cited by examiner

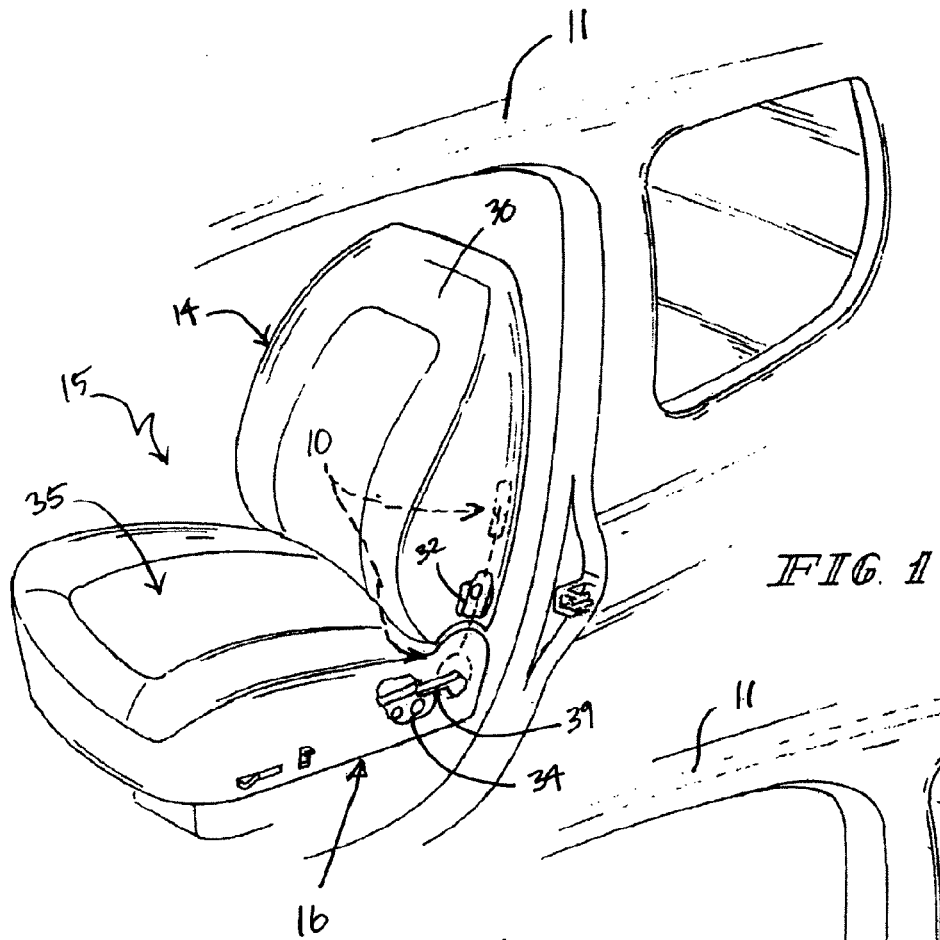
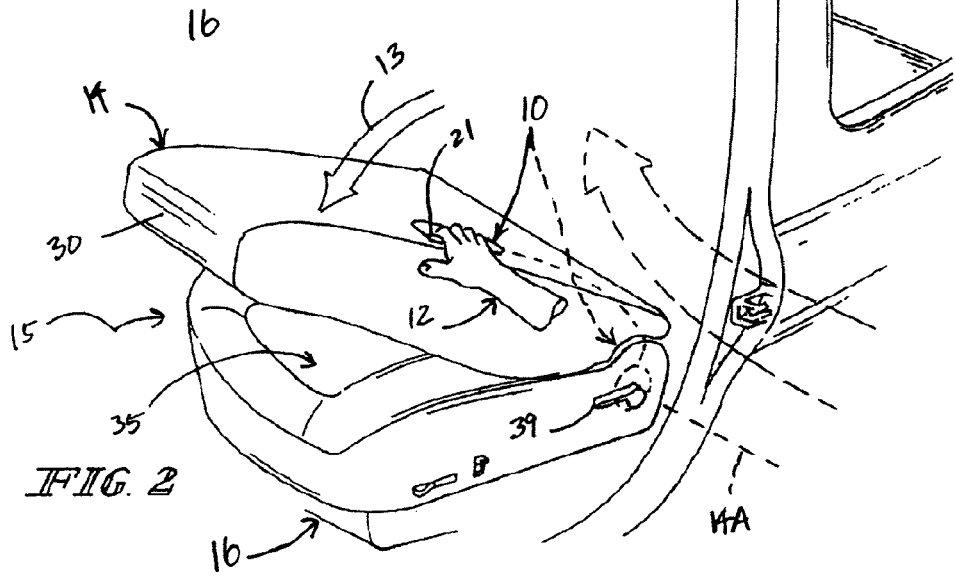

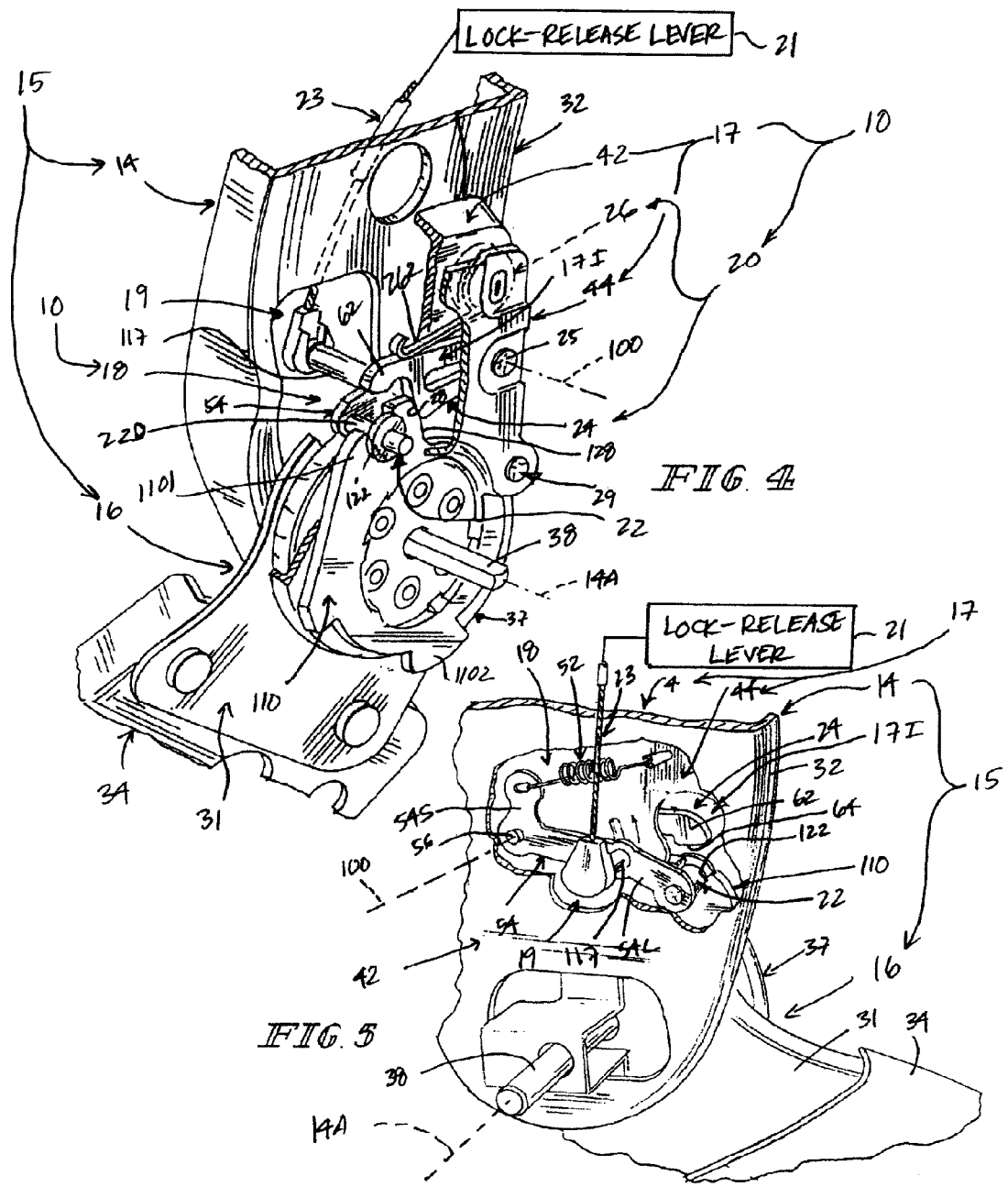

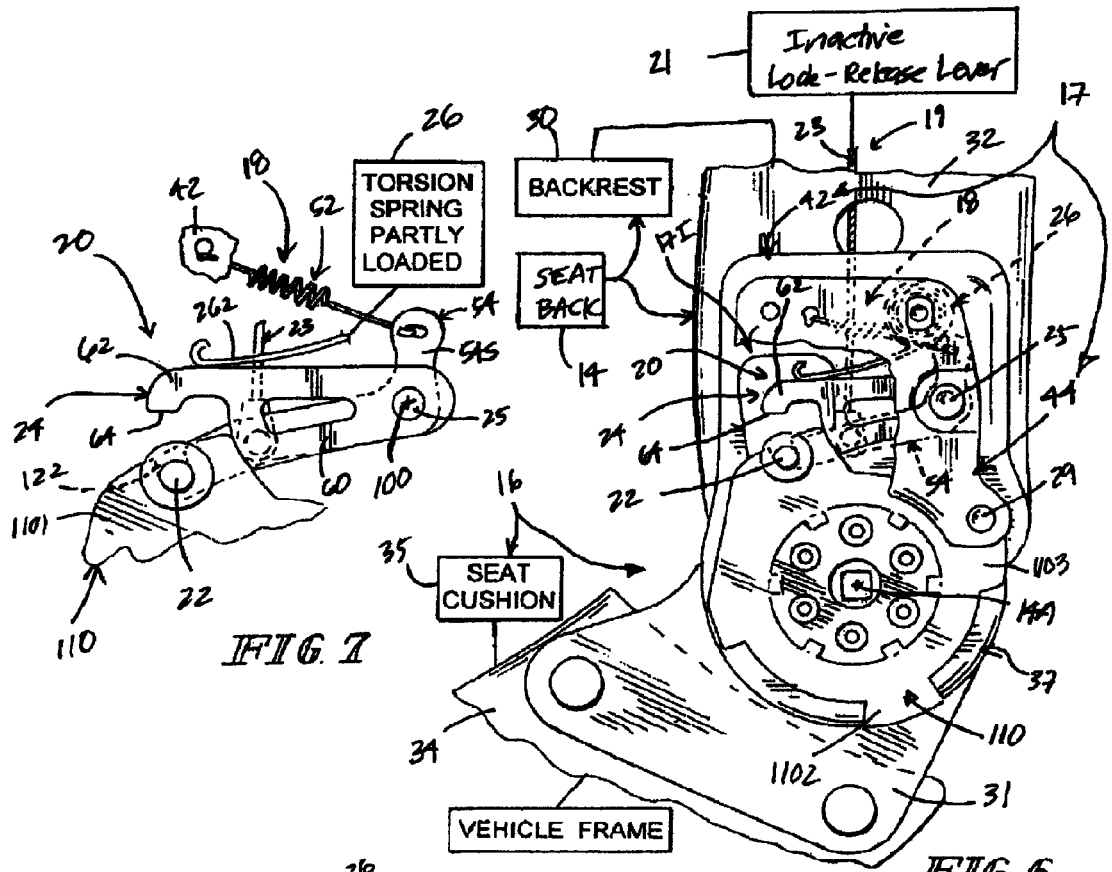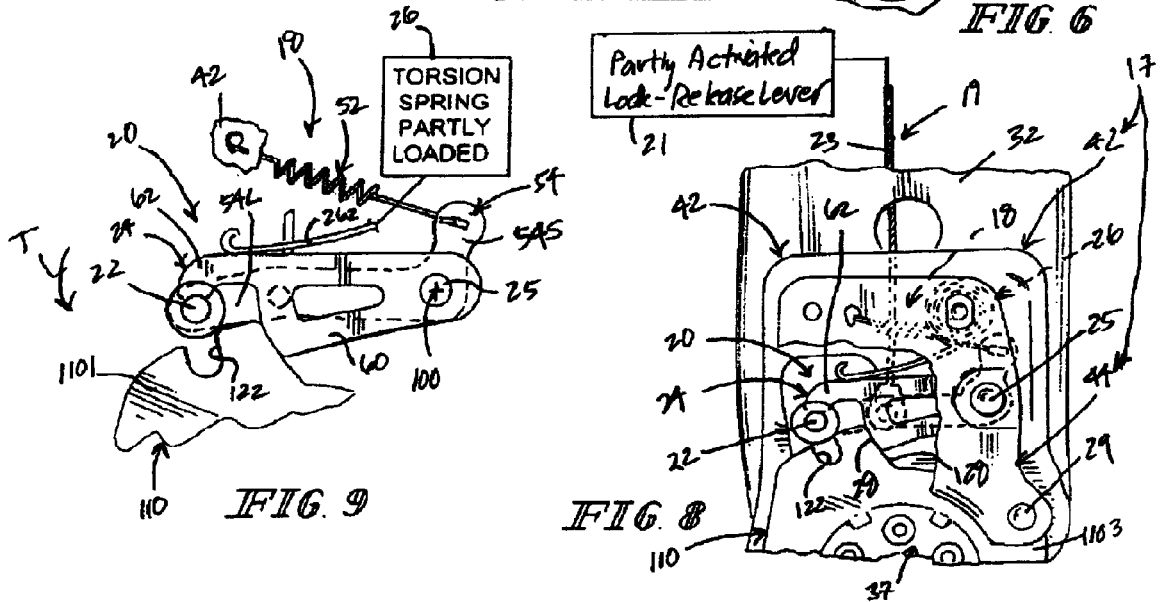

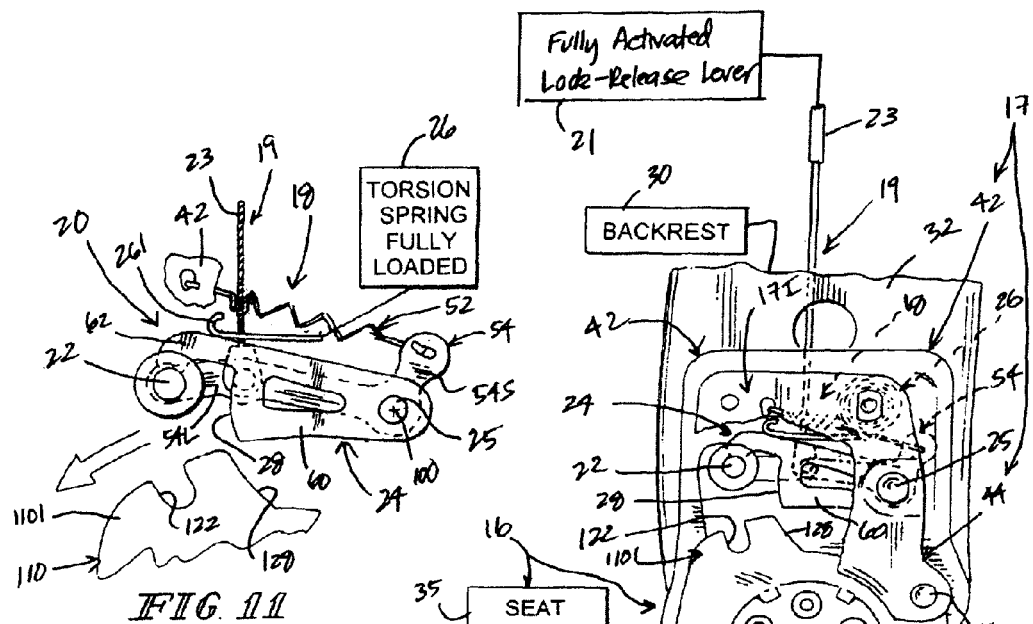
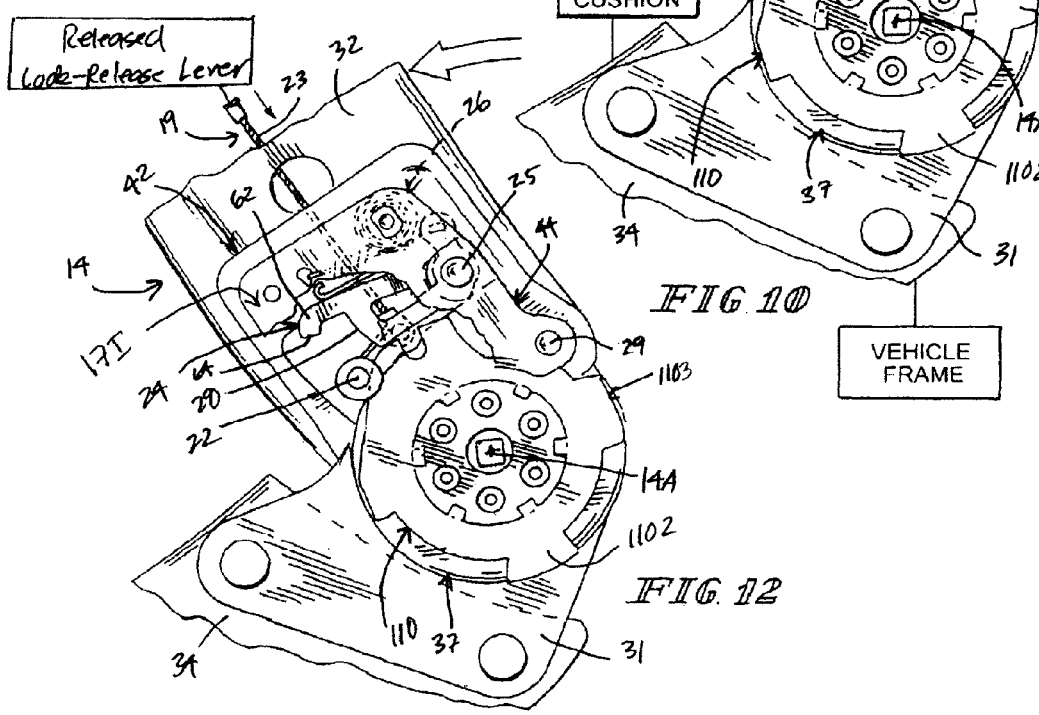
FIG. 11
FIG. 10
FIG. 12

EASY-ENTRY SEAT-BACK RELEASE SYSTEM FOR VEHICLE SEAT

CROSS-REFERENCE TO RELATED APPLICATIONS

This application is a continuation of prior U.S. patent application Ser. No. 13/229,555, filed Sep. 9, 2011, which claims the benefit of U.S. Provisional Patent Application No. 61/381,638, filed Sep. 10, 2010, the entire contents of which are hereby incorporated by reference.

BACKGROUND

The present disclosure relates to vehicle seats, and particularly to lock mechanisms for foldable vehicle seats. More particularly, the present disclosure relates to latches and friction cams included in seat-back lock mechanisms.

SUMMARY

A seatback-motion controller in accordance with the present disclosure is mounted on a passenger seat in a vehicle. The passenger seat includes a seat base and a seat back mounted for pivotable movement relative to the seat base between an upright use position and a forward pivoted position.

In illustrative embodiments, the seatback-motion controller can be operated to release the seat back for pivotable movement between an upright use position and a forward-leaning easy-entry (EE) position. The seatback-motion controller may also be set in accordance with the present disclosure to allow for a full forward dump (table-fold) position or other forward dump position.

In illustrative embodiments, the seatback-motion controller includes a seat-back lock for locking the seat back to the seat base in the upright use position. The seat-back lock includes a latch comprising a pivotable swing arm and a motion-blocking latch pin mounted on the swing arm to pivot therewith. The motion-blocking latch pin is urged into a slot formed in a sector plate included in the seat base to lock the seat back in the upright use position. A latch actuator also included in the seatback-motion controller includes a lock-release lever that can be operated by a vehicle rider to withdraw the motion-blocking latch pin from the slot formed in the seat back.

In illustrative embodiments, the seatback-motion controller also includes a seat-back release manager comprising a friction cam designed to cooperate with neighboring components to manage ergonomic characteristics associated with operation of seatback-motion controller. The friction cam is arranged to interface directly with the sector plate included in the seat base and is separated from and independent of the seat-back lock. As the motion-blocking latch pin is withdrawn fully from the slot formed n the sector plate, it contacts and withdraws the friction cam from contact to the sector plate, thereby freeing the seat back for pivotable movement relative to the seat base.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a foldable vehicle seat located in an interior compartment of a vehicle and visible through an opened doorway and showing a seat base including a seat bottom and a pivotable recliner actuation lever, a seat back arranged to extend upwardly from the seat bottom and mounted for pivotable movement about a horizontal pivot axis, and a seatback-motion controller (shown in phantom);

FIG. 2 is a view similar to FIG. 1 showing that a vehicle rider has operated a lock-release lever mounted in the seat back and included in the seatback-motion controller to actuate a latch also included in the seatback-motion controller to disengage the seat base and free the seat back to pivot in a forward direction from an upright (locked) use position shown in FIG. 1 to the forward-leaning easy-entry (EE) position shown in FIG. 2;

FIG. 4 is an enlarged perspective view of an outer side of the seatback-motion controller of FIG. 1 mounted on the seat base and showing placement of the motion-blocking latch pin included in the seat-back lock in a pin-receiving slot formed in an upwardly extending first flange of a sector plate included in the seat base to block pivoting movement of the seat back relative to the seat base and showing engagement of a left-facing sector-contact surface on the friction cam with a right-facing side edge of the upwardly extending first flange of the sector plate to enhance stability, quietness, and other ergonomic features of the seat back;

FIG. 5 is a perspective view of a reverse (inner) side of the assembly shown in FIG. 4 with a portion of a backrest mount plate broken away to show that the seat-back lock includes a pivotable swing arm mounted on a swing-arm pivot post and formed to include a short segment and a long segment and a latch-return spring coupled to a free end of the short segment, and showing that the motion-blocking latch pin is coupled to the free end of the long segment and the seatback-motion controller also includes a latch actuator including the lock-release lever, a cable mount coupled to a middle portion of the long segment, and an arm-mover cable (Bowden wire) coupled to the lock-release lever and to the cable mount;

FIG. 6 is an outer side elevation view of the assembly shown in FIG. 4 showing the seat back in a stationary locked position owing, in part, to insertion of the motion-blocking latch pin carried on the pivotable swing arm into a pin-receiving slot formed in the upwardly extending first flange of the sector plate included in the seat base;

FIG. 7 is an enlarged elevation view of various components shown in FIG. 6 showing the position of the pivotable friction cam relative to the pivotable swing arm and motion-blocking latch pin when the seat back is locked;

FIG. 8 is an outer side elevation view similar to FIG. 6 after the lock-release lever has been moved by a vehicle rider to a partly activated position to pivot the swing arm in a clockwise direction about a pivot axis through a first angle to withdraw the motion-blocking latch pin from the pin-receiving slot and move the motion-blocking latch pin upwardly to contact a finger included in the pivotable friction cam;

FIG. 9 is a view similar to FIG. 7 showing the position of the raised swing arm relative to the friction cam in the operational stage shown in FIG. 8;

FIG. 10 is an outer side elevation view similar to FIGS. 6 and 8 after the lock-release lever has been moved further by the vehicle rider to pivot the swing arm further in the clockwise direction about the pivot axis to cause the motion-blocking latch pin to apply a clockwise torque to the pivotable friction cam at a pin-contact surface on the finger to cause the friction cam to pivot in the clockwise direction (about the same pivot axis) with the pivoting swing arm so that the sector-contact surface of the friction cam disengages the sector plate to free the seat back to be pivoted forwardly as suggested in FIG. 12;

FIG. 11 is a view similar to FIGS. 7 and 9 showing the position of the raised swing arm relative to the friction cam in the operational stage shown in FIG. 10;

FIG. 12 is a view similar to FIGS. 6, 8, and 10 showing forward pivoting movement of the seat back toward the forward-leaning easy-entry (EE) position shown in FIG. 2 in response to use of the lock-release lever by a vehicle rider to disengage, in sequence, first the motion-blocking latch pin and then the friction cam of the seatback-motion controller from the sector plate of the seat base;

DETAILED DESCRIPTION

Figure 3:
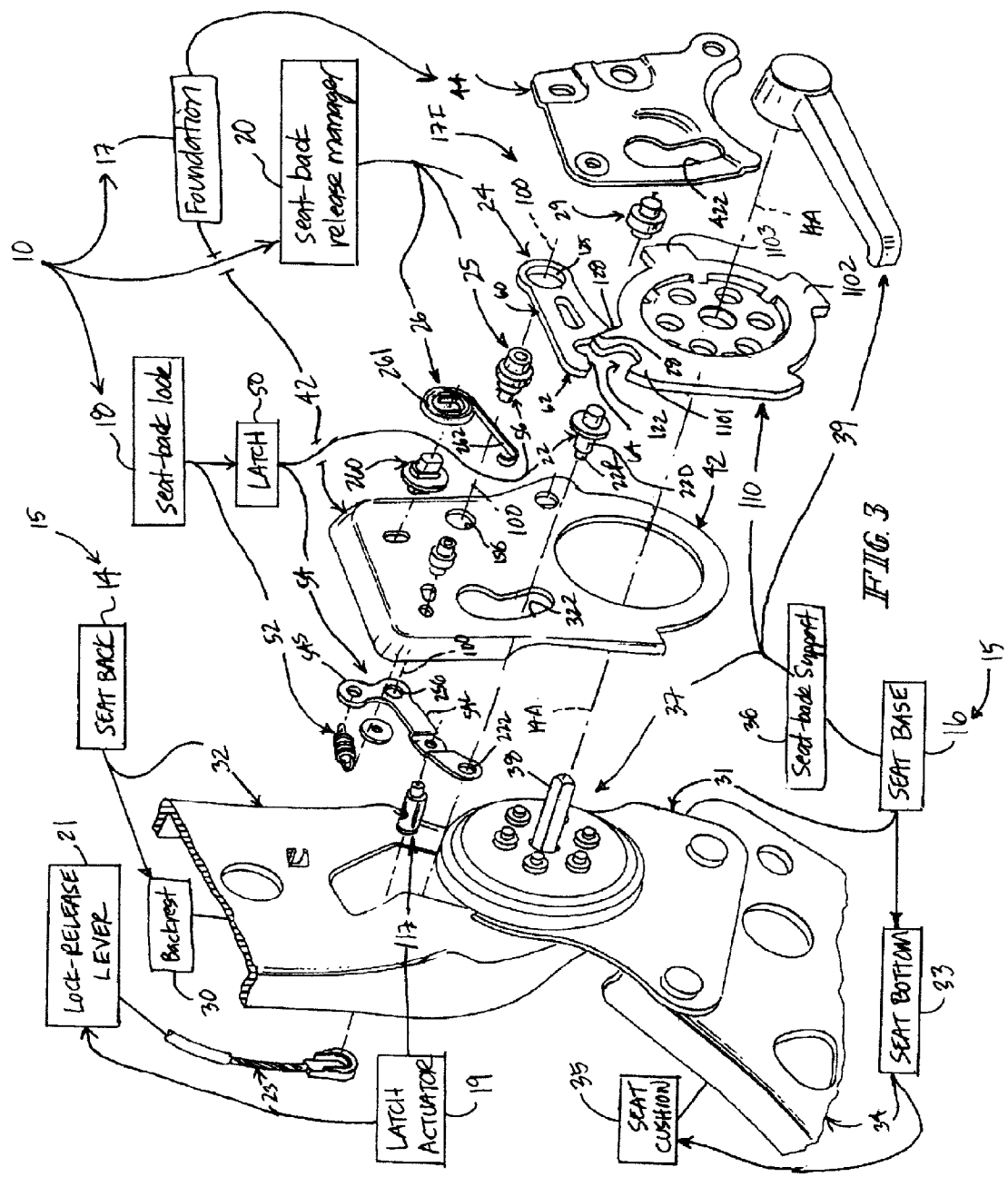
FIG. 3 is an exploded perspective assembly view showing components included in the seat base, seat back, and seatback-motion controller and showing that the seatback-motion controller includes a seat-back lock comprising a latch including a motion-blocking latch (double shear) pin configured to be mounted on an L-shaped pivotable swing arm and a separate and independent seat-back release manager comprising a pivotable friction cam.

A seatback-motion controller 10 in accordance with the present disclosure can be used by a vehicle rider 12 to free a seat back 14 in a vehicle seat 15 to be moved from an upright (locked) use position shown in FIG. 1 in direction 13 to a forward-leaning easy-entry (EE) position shown in FIG. 2. A disassembled illustrative seatback-motion controller 10 is shown in FIG. 3. An assembled illustrative seatback-motion controller 10 is shown in FIGS. 4-6. An operating sequence showing how seatback-motion controller 10 is used to unlock seat back 14 so that it can be pivoted about a seat-back pivot axis 14A relative to a seat base 16 toward the easy-entry (EE) position is shown, for example, in FIGS. 6, 8, 10, and 12.

Seatback-motion controller 10 includes a foundation 17, seat-back lock 18, and a separate and independent seat-back release manager 20 as suggested in FIGS. 3-5. Foundation 17 is coupled to seat base 16 of vehicle seat 15. Each of seat-back lock 18 and seat-release manager 20 are coupled to foundation 17 and mounted for controlled movement relative to foundation 17 and to a sector plate 110 included in seat base 16 to control the motion of seat back 14 relative to seat base 16.

Seatback-motion controller 10 also includes a latch actuator 19 configured to provide vehicle rider 12 with means for unlocking seat-back lock 18 at the option of vehicle rider 12 to release seat back 14 so that it can be pivoted forwardly about seat-back pivot axis 14A to assume the easy-entry (EE) position shown in FIG. 2. In an illustrative embodiment, latch actuator 19 includes a lock-release lever 21 shown illustratively in FIG. 2 and diagrammatically in FIG. 3.

Seat-back lock 18 is arranged and reinforced structurally to engage a sector plate 110 (or other suitable component) included in seat base 16 and located near seat-back pivot axis 14A as suggested in FIG. 4. During exposure of a vehicle 11 including vehicle seat 15 to an external impact, compressive loads applied to seatback-motion controller 10 and associated with such impact will be borne primarily by components (e.g., motion-blocking latch pin 22) included in seat-back lock 18 and not by components (e.g., friction cam 24) included in the separate and independent seat-back release manager 20.

Seat-back lock 18 includes a motion-blocking latch pin 22 that can be (1) inserted into a pin-receiving slot 122 formed in an upwardly extending first flange 1101 of a sector plate 110 included in seat base 16 to lock seat back 14 in the upright (locked) use position as suggested in FIGS. 4-7 and (2) removed from pin-receiving slot 122 to disable primary seat-back lock 18 as suggested in FIGS. 8-12. Motion-blocking latch pin 22 is configured and arranged to bear all of the compressive load applied to seatback-motion controller 10 during a vehicle front impact situation and to share with the stop pin 29 included in seatback-motion controller 10 the compressive load applied to seatback-motion controller 10 during a vehicle rear impact situation.

Figure 16:
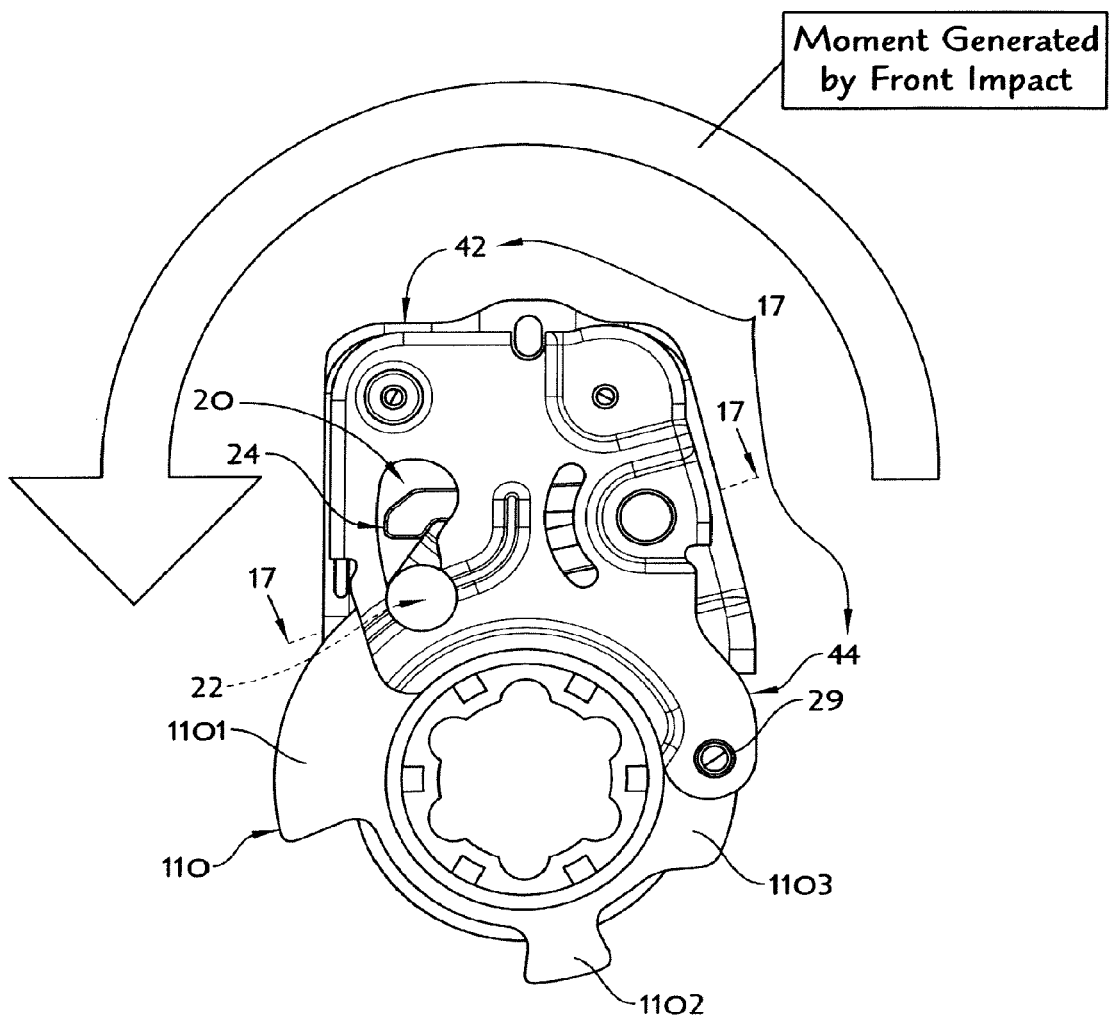
FIGS. 16-21 show diagrammatically the application of external forces to components included in the seatback-motion controller in response to exposure to moments generated by front and rear impacts to a vehicle having a seat including the seatback-motion controller.
Figure 17:
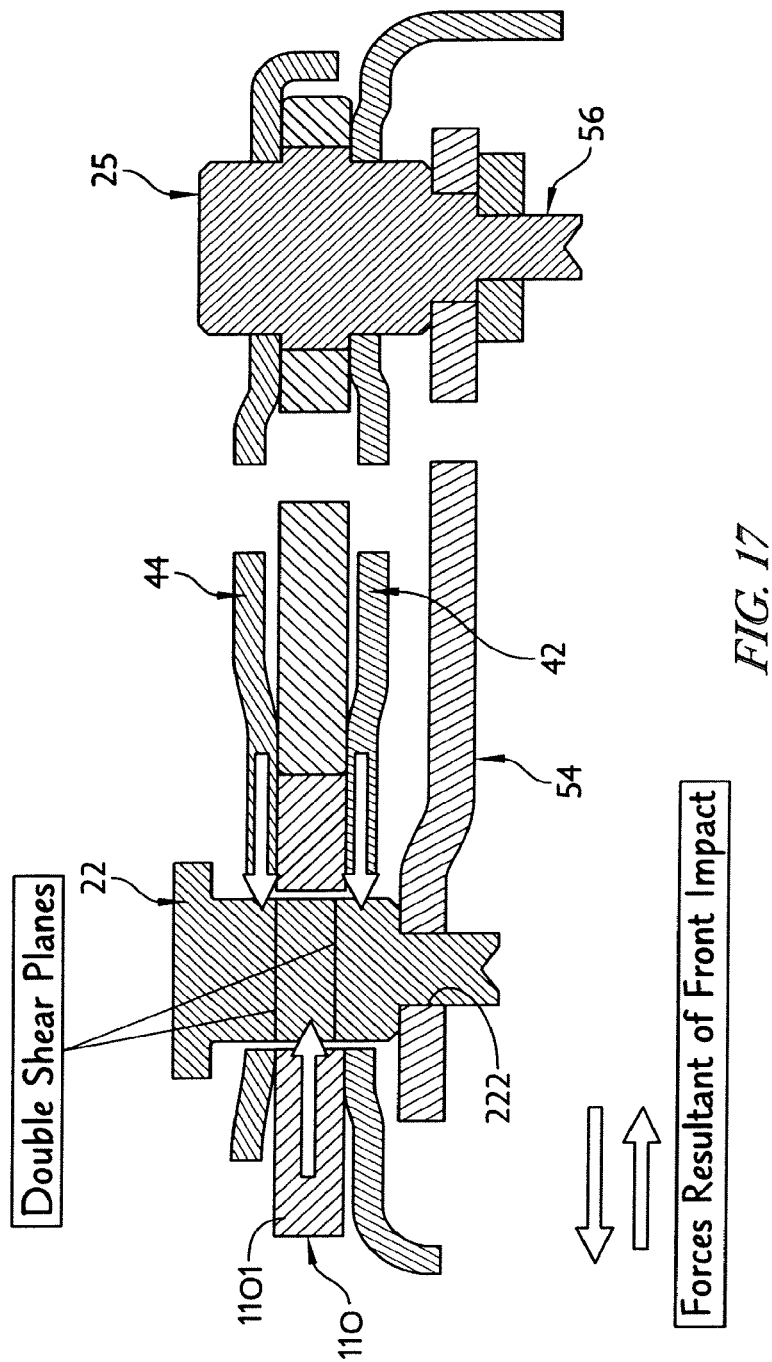

In a vehicle front impact situation, motion-blocking latch pin 22 on seat-back lock 18 will bear the compressive load through a configuration that puts motion-blocking latch pin 22 into a double shear condition as suggested, for example, in FIGS. 16 and 17. As seat back 14 attempts forward pivoting rotation due to the frontal impact, the upwardly extending first flange 1101 pushes centrally and rearwardly onto segment 22D of motion-blocking latch pin 22. Concurrently, as seat back 14 attempts forward pivoting motion due to the frontal impact, the interface between motion-blocking latch pin 22 and the slot edge 322 of inner shell 42 as well as the interface between motion-blocking latch pin 22 and the slot edge 422 of outer shell 44 exert forward forces onto motion-blocking latch pin 22. The central rearward force exerted by sector tab 1101 onto segment 22D of motion-blocking latch pin 22 combined with the forward forces exerted by slot edges 322 and 422 of inner shell 42 and outer shell 44 respectively onto each end of segment 22D of motion-blocking latch pin 22 creates the previously mentioned double shear condition as shown diagrammatically in FIG. 17.

Figure 18:
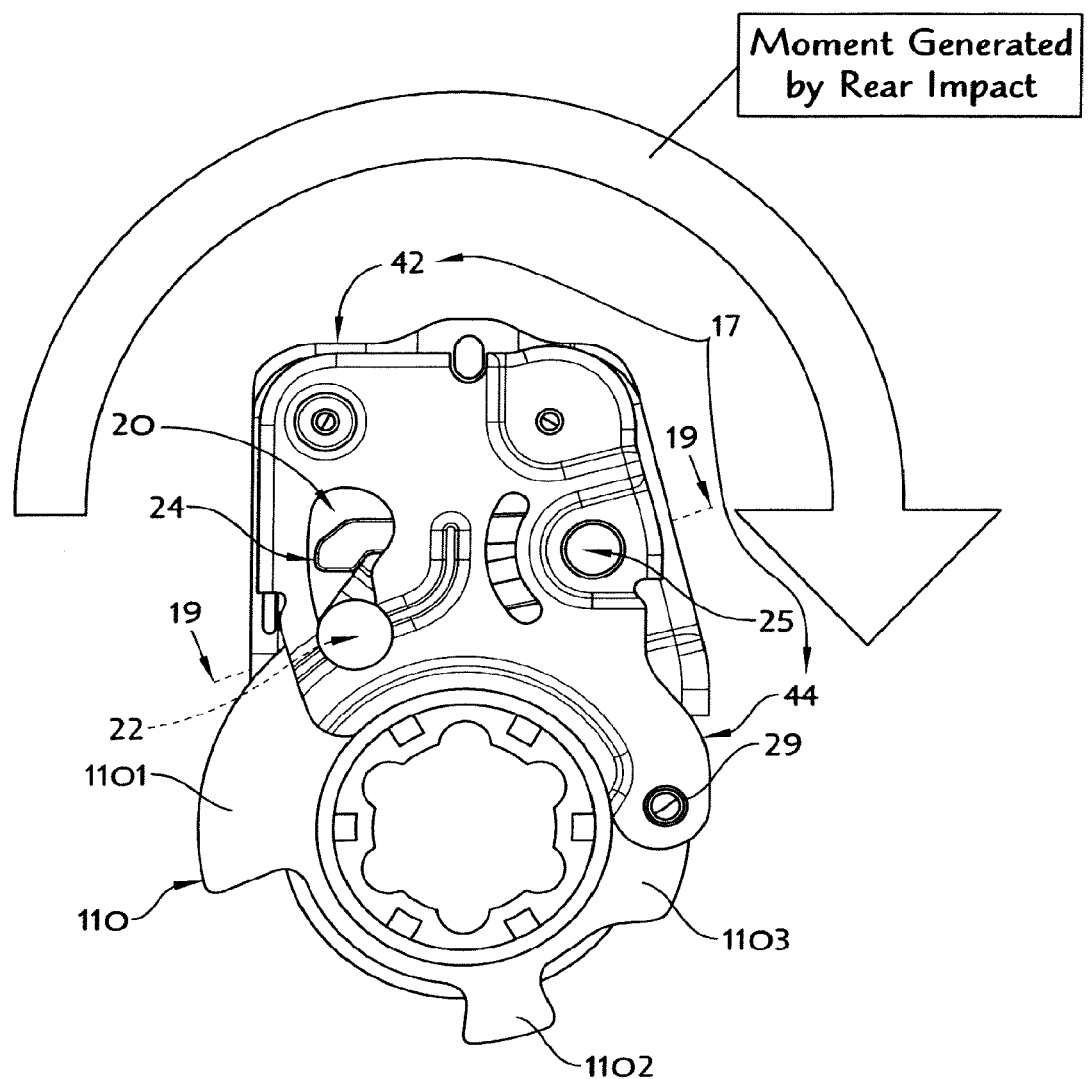
Figure 19:
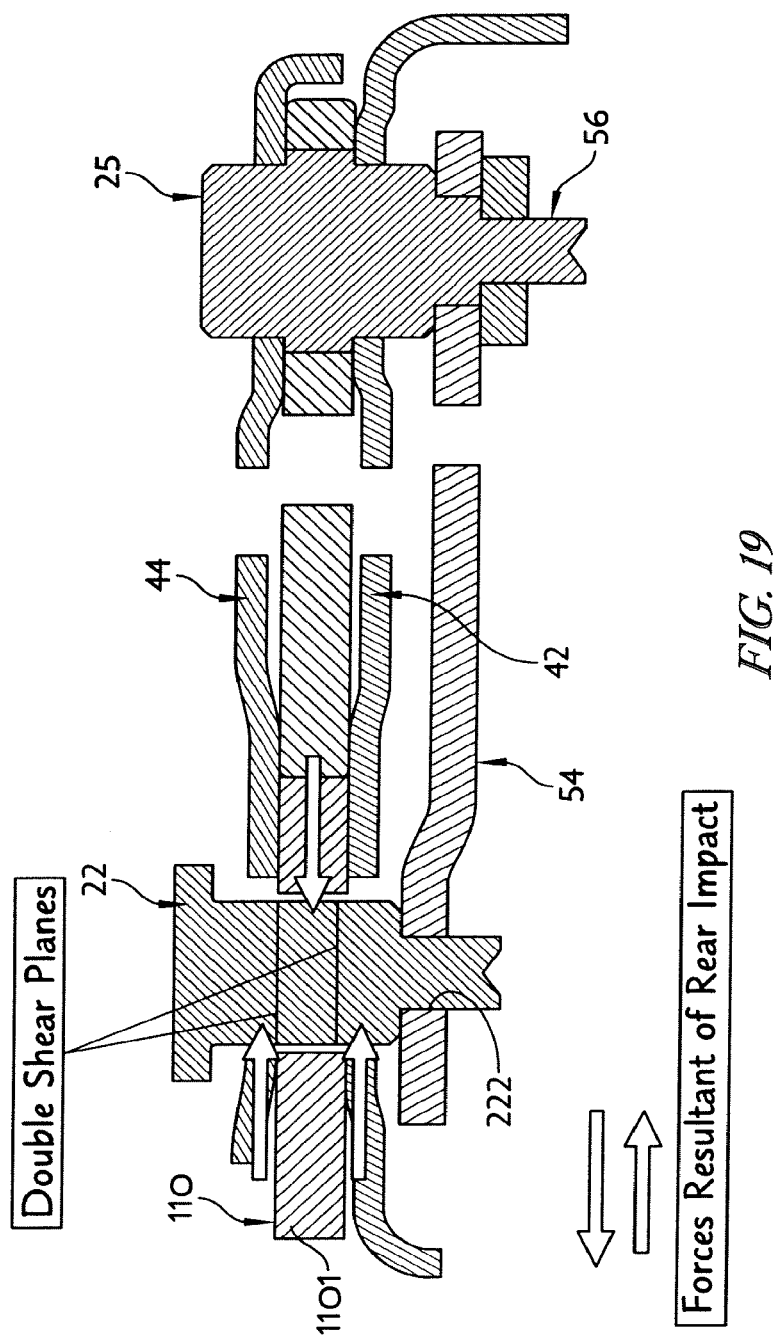
Figure 20:
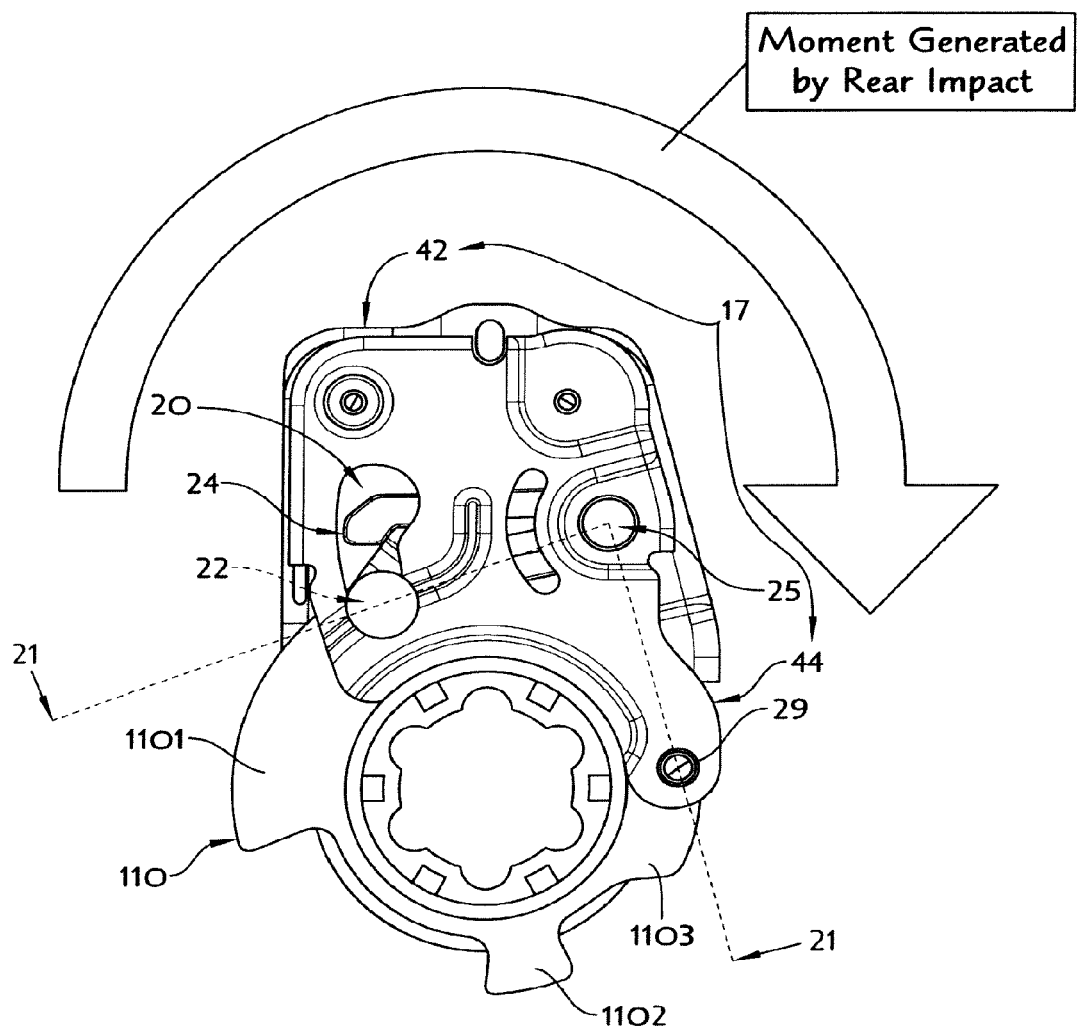
Figure 21:
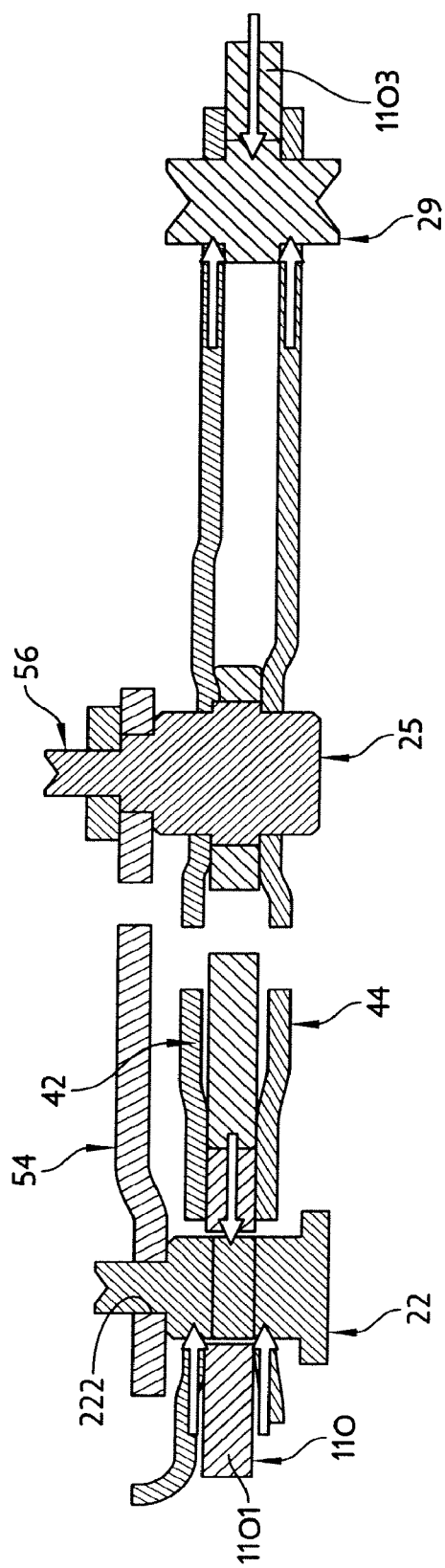

In a vehicle rear impact situation, motion-blocking latch pin 22 on seat-back lock 18 will bear part of the compressive load due to the rear impact, as suggested, for example, in FIGS. 18 and 19. The upwardly extending second flange (established between the rearward edge of pin-receiving slot 122 and edge 128 both of sector plate 110) pushes centrally and forwardly onto segment 22D of motion-blocking latch pin 22. Concurrently, as seat back 14 attempts rearward pivoting motion due to the rear impact, the interface between motion-blocking latch pin 22 and the slot edge 322 of inner shell 42 as well as the interface between motion-blocking latch pin 22 and the slot edge 422 of outer shell 44 exert rearward forces onto motion-blocking latch pin 22. The central forward force exerted by upwardly extending second flange (established between the rearward edge of pi-receiving slot 122 and edge 128 both of sector plate 110) onto segment 22D of motion-blocking latch pin 22 combined with the rearward forces exerted by slot edges 322 and 422 of inner shell 42 and outer shell 44 respectively onto each end of segment 22D of motion-blocking latch pin 22 creates the previously mentioned double shear condition as shown diagrammatically in FIG. 19.

Seat-back release manager 20 includes a pivotable friction cam 24 that is urged by a cam-return spring 26 normally to cause a sector-contact (base-contact) surface 28 provided on friction cam 24 to engage an external cam-contact surface 128 provided on sector plate 110 to manage buzz-squeak-rattle ("BSR"), chuck, and system release efforts. Friction cam 24 is configured and arranged to manage these ergonomic characteristics and is separated from and independent of components included in seat-back lock 18 and thus is not required to absorb any compressive loads associated with exposure of vehicle 21 to external impact forces. In an illustrative embodiment, friction cam 24 is configured and arranged so that it can function to block minor pivotable movements (for example, vibration) of seat back 14 by contacting a portion (for example, cam-contact surface 128 on sector plate 110) of seat base 16 and not by contacting a portion of seat-back lock 18.

In illustrative embodiments, seat back 14 includes a backrest 30 and a backrest mount plate 32 coupled to backrest 30 and located near sector plate 110 in base 16 as suggested in FIGS. 1 and 3. Seat base 16 also includes a seat bottom 33 including a seat pan 34 and a seat cushion 35 arranged to set on seat pan 34, a seat bottom mount plate 31, and a seat-back support 36 as suggested in FIG. 3. For example, seat-back support 36 includes an angle adjuster unit 37 coupled to seat bottom mount plate 31 and configured to include a recliner control spindle 38 that is arranged to extend along seat-back pivot axis 14A, sector plate 110, and a recliner actuation lever 39 coupled to recliner control spindle 38 as suggested in FIG. 3.

Foundation 17 of seatback-motion controller 10 is configured to mount on seat back 14 for pivotable movement therewith about pivot axis 14A as shown, for example, in FIGS. 10 and 12 and support each of the seat-back lock 18 and seat-back release manager 20 as suggested in FIGS. 3 and 4. In an illustrative embodiment, foundation 17 includes an inner shell 42 mounted on seat base 16 and an outer shell 44 arranged to lie in spaced-apart relation to inner shell 42 to locate portions of sector plate 110, seat-back lock 18, and seat-back release manager 20 therebetween. It is within the scope of the present disclosure to provide any suitable foundation on seat base 16 configured to (1) support seat-back lock 18 so that motion-blocking latch pin 22 is able to move to engage and disengage sector plate 110 of seat base 16 and (2) support seat-back release manager 20 so that friction cam 24 is able to move to engage and disengage sector plate 110 of seat base 16.

In an illustrative embodiment, stop pin 29 included in seatback-motion controller 10 is coupled to and arranged to lie between inner and outer shells 42, 44 of foundation 17 as suggested in FIGS. 3 and 4. Stop pin 29 is arranged to engage a second flange 1103 on sector plate 110 to stop rearward pivoting movement of seat back 14 relative to seat-base 16 and establish the upright (locked) use position of seat back 14 as suggested in FIGS. 6, 8, and 10.

As described herein, the motion-blocking latch pin 22 is configured and arranged to share with stop pin 29 the compressive load applied to seatback motion controller 10 during a vehicle rear impact situation as suggested, for example, in FIGS. 18 and 19. In this situation, stop pin 29 will bear part of the compressive load through a configuration that puts stop pin 29 into a double shear condition. As seat back 14 attempts rearward pivoting rotation due to the rear impact, the second flange 1103 pushes centrally and upwardly onto the central segment of stop pin 29. The small round segment sections on each end of the central segment of stop pin 29 extend through dedicated holes on inner shell 42 and outer shell 44. It is at these interfaces that the previously mentioned double shear occurs. Since motion-blocking latch pin 22 absorbs part of the compressive load, then stop pin 29 may be designed to be smaller than if the full compressive load had to be absorbed by stop pin 29.

Seat-back lock 18 includes a latch 50 and a latch-return spring 52 as shown, for example, in FIGS. 3 and 5. Latch 50 includes a swing arm 54, a swing-arm pivot post 56, and motion-blocking latch pin 22. Swing arm 54 is mounted on swing-arm pivot post 56 to pivot about a latch pivot axis 100 and to carry motion-blocking latch pin 22 toward and away from sector plate 110 of seat base 16 during operation of seatback-motion controller 10 by a vehicle rider 12 as suggested, for example, in FIGS. 2 and 7-12. Latch-return spring 52 is coupled to inner shell 42 of foundation 17 and to swing arm 54 of latch 50 as suggested in FIG. 5.

In an illustrative embodiment shown in FIGS. 3 and 5, swing arm 54 is an L-shaped monolithic member and includes a short segment 54S and a long segment 54L coupled to short segment 54S. A post-receiving aperture 256 is formed in swing arm 54 at the intersection of segments 54S and 54L and sized to receive a free end of swing-arm pivot post 56 therein. An aperture 222 is formed in the free end of long segment 54L and sized to receive a root portion 22R of motion-blocking latch pin 22 therein as suggested in FIGS. 3 and 4.

Swing-arm pivot post 56 is coupled to inner shell 42 of foundation 17 and configured to support swing arm 54 for pivotable motion about latch pivot axis 100 between a sector plate slot-engaging position shown in FIGS. 4-7 and sector plate slot-disengaging positions shown in FIGS. 8-12. In an illustrative embodiment, swing-arm pivot post 56 extends through an aperture 156 formed in inner shell 42 of foundation 17 to cause inner shell 42 to lie between swing arm 54 and outer shell 44 of foundation 17 as suggested in FIG. 3. Swing arm 54 is free to pivot on swing-arm pivot post 56 in a space provided between backrest mount plate 32 and inner shell 42 of foundation 17 as suggested in FIGS. 3 and 5. Motion-blocking latch pin 22 is fixed on swing arm 54 and arranged to extend through and move back and forth simultaneously in a banana-shaped slot 322 formed in inner shell 42 of foundation 17 and a similar slot 422 formed in outer shell 44 of foundation 17 during pivoting movement of swing arm 54 on swing-arm pivot post 56 about latch pivot axis 100 as suggested in FIGS. 3 and 5.

Latch-return spring 52 is coupled at one end to inner shell 42 of foundation 17 and at an opposite end to a free end of short segment 54S of swing arm 54 as shown, for example, in FIG. 5. Latch-return spring 52 is configured to provide means for yieldably urging swing arm 54 normally toward sector plate 110 of seat base 16 and to cause motion-blocking latch pin 22 to move into pin-receiving slot 122 formed in the upwardly extending first flange 1101 included in sector plate 110 to assume a locked position as suggested in FIGS. 5-7 when motion-blocking latch pin 22 is aligned with pin-receiving slot 122. In an illustrative embodiment, latch-return spring 52 is an extension spring shown in an installed condition in FIGS. 5-7, a partly stretched condition in FIGS. 8 and 9, and a fully stretched condition in FIGS. 10 and 11.

Latch actuator 19 includes lock-release lever 21, cable mount 117, and arm-mover cable 23 as suggested in FIGS. 3 and 4. A vehicle rider 12 can operate latch actuator 19 as suggested in FIGS. 2 and 8-11 to unlock seat-back lock 18 and free seat back 14 to be pivoted about seat-back pivot axis 14A from an upright (locked) use position shown, for example, in FIG. 1 to a forward-leaning easy-entry (EE) position shown, for example, in FIG. 2. It is within the scope of this disclosure to use any suitable latch actuator to cause swing arm 54 to pivot about pivot axis 100 to disengage motion-blocking latch pin 22 from sector plate 110 of seat base 16 to move motion-blocking latch pin 22 to a withdrawn position when it is desired to unlock seat-back lock 18.

In an illustrative embodiment, cable mount 117 is a rod coupled to a middle section of long segment 54L of swing arm 54 as suggested in FIGS. 3 and 5. Arm-mover cable 23 includes a coupling fixed to cable mount 117 and a Bowden wire arranged to interconnect the coupling and lock-release lever 21. In use, whenever a vehicle rider 12 moves lock-release lever 21 a sufficient amount relative to seat back 14, then swing arm 54 will be pivoted about latch pivot axis 100 to cause motion-blocking latch pin 22 to move away from sector plate 110 of seat base 16 toward a withdrawn position and latch-return spring 52 to be stretched.

Seat-back release manager 20 includes friction cam 24, cam-return spring 26, and a cam-pivot post 25 as shown, for example, in FIGS. 3 and 4. Friction cam 24 is arranged to pivot on cam-pivot post 25 about latch pivot axis 100 to engage and establish frictional contact with sector plate 110 of seat base 16 directly at various times during operation of seatback-motion controller 10 to provide means for managing ergonomic sensations detected by vehicle rider 12 during operation of lock-release lever 21 mounted on seat back 14 to release and unlock seat-back lock 18. Friction cam 24 is not configured and arranged to contact seat-back lock 18 to block pivotable movement of seat back 14 about seat-back pivot axis 14A.

Figure 13:
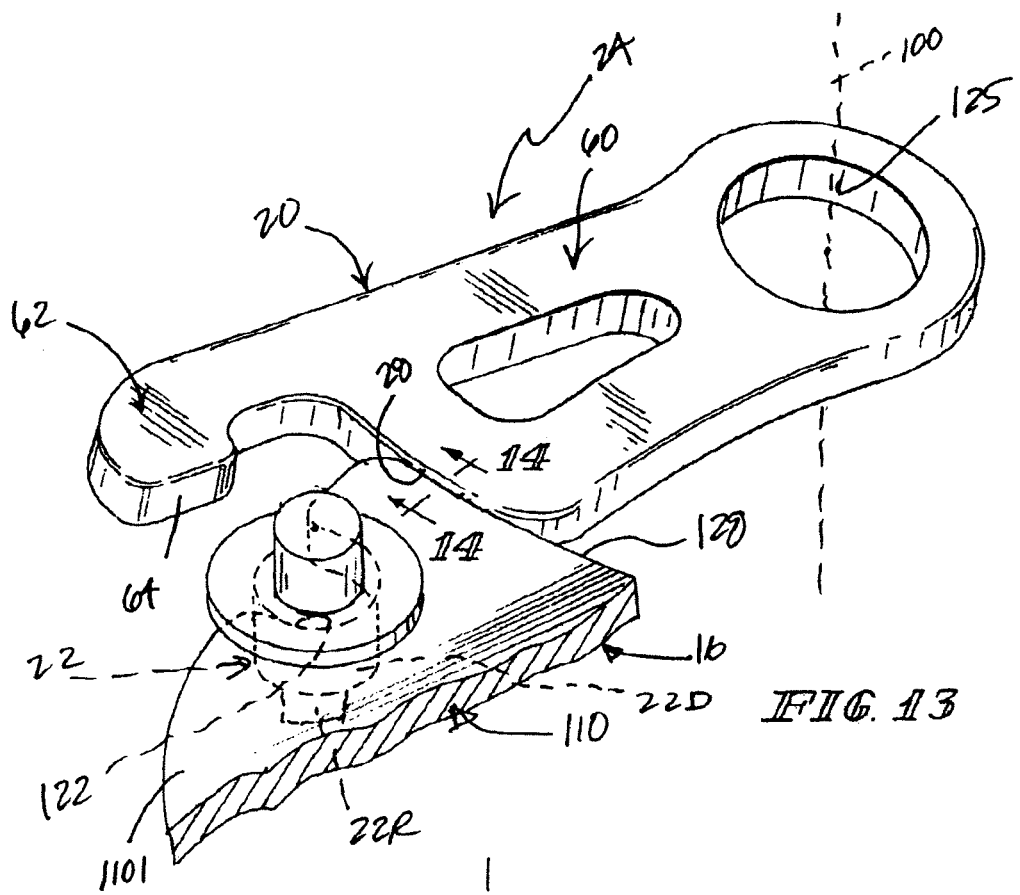
FIG. 13 is an enlarged perspective view of the friction cam in engagement with the first flange of the sector plate in the operational stage shown in FIGS. 4-7.
Figure 14:
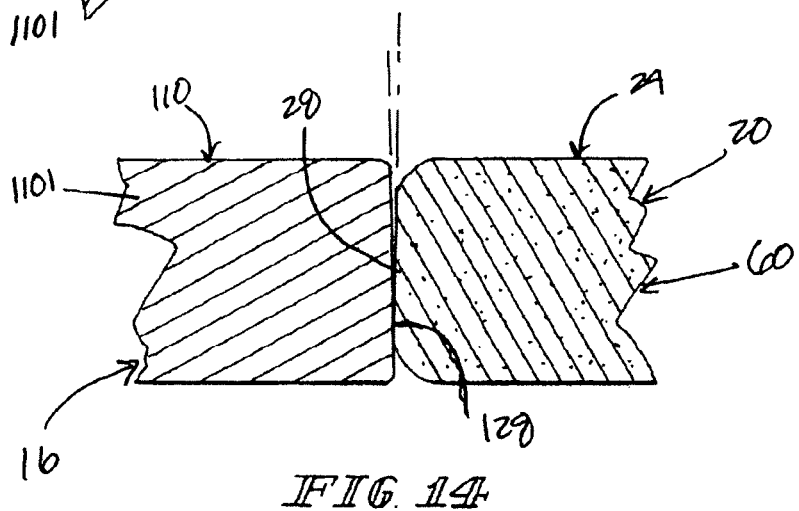
FIG. 14 is an enlarged sectional view taken along line 14-14 of FIG. 13.

Friction cam 24 includes a wedge 60 (of any suitable shape) that is formed to include a post-receiving aperture 125 centered on latch pivot axis 100 at an inner end thereof and sector-contact surface 28 at an opposite outer end thereof as shown, for example, in FIGS. 3, 13, and 14. Sector-contact surface 28 is arranged to establish frictional contact with a cam-contact surface 128 provided on the upwardly extending first flange 1101 of sector plate 110 of seat base 16. Friction cam 24 also includes a curved finger 62 cantilevered to the outer end of wedge 60 and formed to include a downwardly facing latch-contact surface 64 as suggested in FIGS. 3, 13, and 14. Latch-contact surface 64 is arranged to be engaged by an inner driver portion 22D of motion-blocking latch pin 22 during outward pivoting movement of swing arm 54 about latch pivot axis 100 to disengage motion-blocking latch pin 22 from pin-receiving slot 122 in sector plate 110 of seat base 16 to move motion-blocking latch pin 22 to the withdrawn position separated from seat base 16 as suggested in the sequence shown in FIGS. 8-11.

Cam-return spring 26 is a clock spring in an illustrative embodiment as shown in FIG. 3. Cam-return spring 26 includes a spiral-wound coil 261 mounted on a spring mount 260 coupled to inner shell 42 of foundation 17 and a leg 262 coupled to coil 261 and biased yieldably to engage an upper edge of friction cam 24 as suggested in FIGS. 3-7. Cam-return spring 26 has a spring rate selected by a spring designer to apply a counterclockwise torque (T) to friction cam 24 as suggested diagrammatically in FIG. 9 to maintain sector-contact (base-contact) surface 28 of friction cam 24 in frictional contact with cam-contact surface 128 of sector plate 110 of seat base 16 to establish an engaged position until motion-blocking latch pin 22 is moved to engage finger 62 of friction cam 24 and pivot friction cam 24 on cam-pivot post 25 about latch pivot axis 100 to disengage sector plate 110 of seat base 16 and move to a disengaged position as suggested in a sequence shown, for example, in FIGS. 8-11.

Cam-pivot post 25 is located between and coupled to inner and outer shells 42, 44 of foundation 17 as suggested in FIG. 3. Cam-pivot post 25 is configured to support friction cam 24 for pivotable movement about latch pivot axis 100 between engaged and disengaged positions as suggested in FIGS. 7, 9, and 11. In illustrative embodiments, swing-arm pivot post 56 and cam-pivot post 25 are united to form a monolithic component mounted on inner and outer shells 42, 44 of foundation 17 as suggested in FIG. 3.

Figure 15:
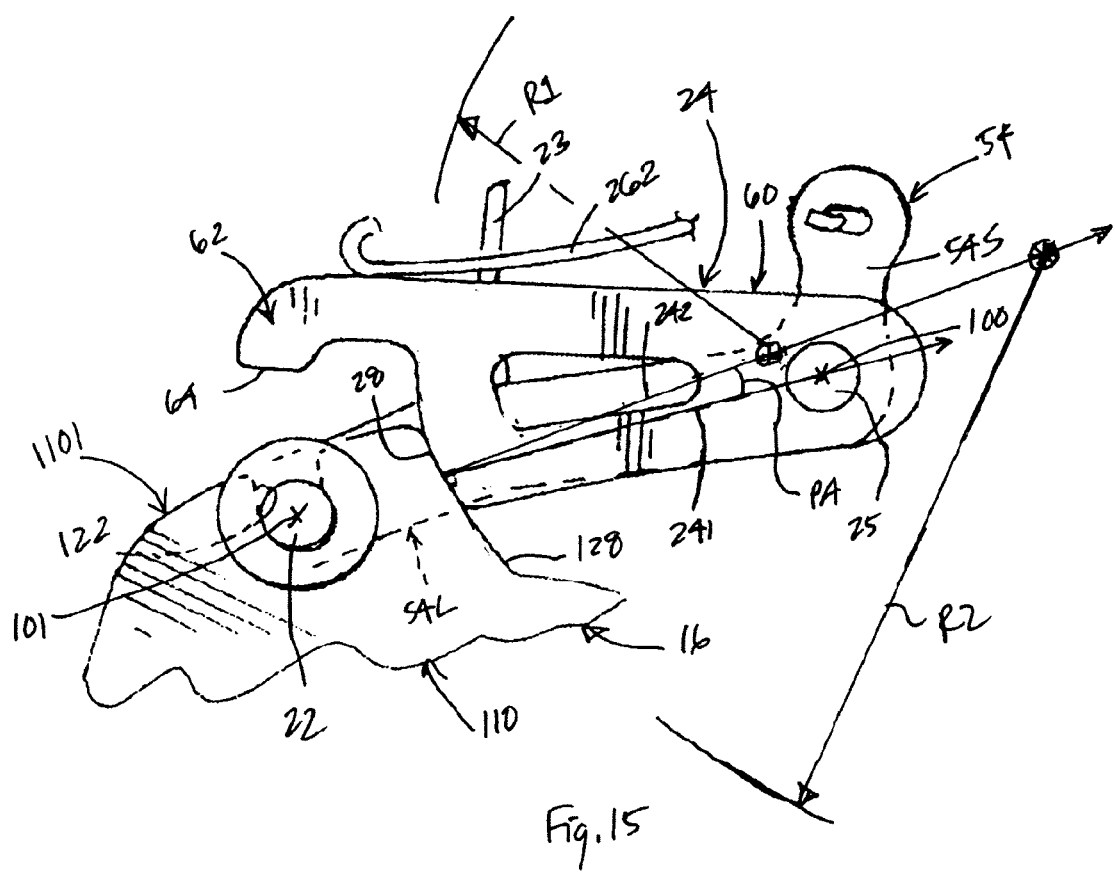
FIG. 15 is an enlarged side elevation view showing the friction cam of the seat-back release manager in mating engagement with the sector plate to illustrate the pressure angle (PA) [also known as the lock angle] associated with the friction cam and the companion motion-blocking latch pin.

There is a pressure angle PA (lock angle) associated with friction cam 24 as shown diagrammatically in FIG. 15. The pressure angle is the measure of the angle formed between two straight line rays. The first straight line ray extends from the contact point established between mating portions of sector-contact (base-contact) surface 28 on friction cam 24 and cam-contact surface 128 on sector plate 110 to pivot axis 100. The second straight line ray 242 extends from the same contact point through both the origin of the radius R1 defining sector-contact surface 28 and the origin of the radius R2 defining cam-contact surface 128 as suggested in FIG. 15. In operation, if the pressure angel PA is too small, then friction cam 24 can bind and make it difficult for vehicle rider 12 to release the friction cam 24 from engagement with sector plate 110 and free seat back 14 to pivot forwardly to the easy-entry (EE) position. If the pressure angle PA is too large, then friction cam 24 will pivot about latch pivot axis 100 too soon and disrupt ergonomic factors associated with seatback-motion controller 10 controlled by friction cam 24.

Friction cam 24 is arranged to contact sector plate 110 of seat base 16 directly to manage BSR, chuck, release, and other ergonomic characteristics. In the illustrated embodiment, sector-contact (base-contact) surface 28 of friction cam 24 mates with cam-contact surface 128 of sector plate 110 to establish a pressure-angle PA associated with friction cam 24 as suggested in FIG. 15. Because friction cam 24 is separate and independent from seat-back lock 18 in the present disclosure, pressure angle PA can be increased at the option of a cam designer without affecting operation and functionality of seat-back lock 18. Likewise, any grease may be used with friction cam 24 without impacting operation or functionality of seat-back lock 18. In an illustrative embodiment, pressure angle PA is about 7.5.degree., but may be enlarged or reduced to achieve desirable ergonomics.

Cam-return spring 26 is dedicated to friction cam 24 and is separate and independent from the latch-return spring 52 used in seat-back lock 18 to apply biasing forces to swing arm 54 included in latch 50 of seat-back lock 18. Thus, cam-return spring 26 can be designed to regulate the release effort and binding potential associated with friction cam 24 separately and independently of latch-return spring 52.

By pulling upwardly on swing arm 54 using arm-mover cable 23, a constant release stroke is realized as motion-blocking pin 22 moves from the locked position shown in FIG. 7 to the withdrawn position shown in FIG. 9. Positional variation of friction cam 24 is not a factor and therefore inboard latch to outboard latch synchronization is achieved more easily.

In illustrative embodiments, sector plate 110 is fine-blanked and made of a metal while friction cam 24 is made of a press and sintered powdered metal. This allows working surface 28 of friction cam 24 to be substantially flat in one illustrative embodiment as suggested in FIG. 14. By making friction cam 24 using a powdered metal material, potential for binding is reduced, burrs and edge taper can be avoided, lubricants may be added to the powdered metal mix during manufacturing, and surface roughness can be minimized as compared to friction cams made of metal in a fine-blanking process. Friction cam 24 in seatback-motion controller 10 is not expected to withstand high compressive loads associated with external impacts, and thus it is viable to make friction cam 24 of a powdered metal material.

Seatback-motion controller 10 is configured in accordance with the present disclosure to facilitate optimization of the pressure angle PA associated with friction cam 24. Separation of friction cam 24 from seat-back lock 18 in accordance with the present disclosure minimizes engineering and rework changes associated with pressure angle PA change after product launch because such changes can be made without any changes to the structure, function, or operation of seat-back lock 18. Powdered metal tools are relatively inexpensive with shorter lead times to produce any new friction cam 24. Adjustments to spring rate of cam-return spring 26, pressure angle PA, and friction cam 24 can be made easily at a later stage of product development to enhance ergonomic factors associated with seat-back release manager 20 and its friction cam 24.

A seatback-motion controller 10 is provided for a vehicle seat including a seat base 16 and a seat back 14 as suggested in FIGS. 1 and 2. Seat base 16 is formed to include a pin-receiving slot 122 and a cam-contact surface 128 as suggested in FIGS. 3 and 4. Seat back 14 is mounted for forward and rearward pivotable movement about a seat-back pivot axis 14A relative to seat base 16 between an upright use position shown in FIG. 1 and a forward-leaning easy-entry position shown in FIG. 2.

Seatback-motion controller 10 includes a foundation 17 adapted to be coupled to seat back 14 to pivot therewith relative to seat base 16 about seat-back pivot axis 14A as suggested in FIGS. 10 and 12. Seatback-motion controller 10 also includes a seat-back lock 18 and a separate and independent seat-back release manager 20 as suggested in FIGS. 3 and 4.

Seat-back lock 18 is coupled to foundation 17 to move therewith during pivoting movement of seat back 14 about seat-back pivot axis 14A relative to seat base 16. Seat-back lock 18 includes a latch 50 having a motion-blocking latch pin 22 and a swing arm 54 coupled to motion-blocking latch pin 22 as suggested in FIG. 3. Swing arm 54 is arranged to pivot relative to foundation 17 about a latch pivot axis 100 to move motion-blocking latch pin 22 relative to foundation 17 between a locked position (see FIGS. 4-7, 13, and 15) located in pin-receiving slot 122 formed in seat base 16 to block pivotable movement of seat back 14 relative to seat base 16 in a counterclockwise direction from an upright use position (see FIGS. 1 and 6) to a forward-leaning easy-entry position (see FIG. 2) and a withdrawn position (see FIGS. 8 and 9) located outside of pin-receiving slot 122 to disable seat-back lock 18 and free seat back 14 for pivotable movement from the upright use position to the forward-leaning easy-entry position. Due to the independent relationship between seat-back lock 18 and seat-back release manager 20, motion-blocking latch pin 22 of seat-back lock 18 is free to engage pin-receiving slot 122 regardless of the orientation of friction cam 24.

Seat-back release manager 20 includes a cam-pivot post 25 coupled to foundation 17 to move therewith and a friction cam 24 as suggested in FIG. 3. Friction cam 24 is mounted on cam-pivot post 25 for pivotable movement between an engaged position (see FIGS. 6-8) establishing frictional contact with cam-contact surface 128 included in seat base 16 (e.g., on sector plate 110) to block minor pivotable movement of seat back 14 (caused, for example, by vibration), thus stabilizing seat back 14 in the upright use position to the forward-leaning easy-entry position.

Swing arm 54 of seat-back lock 18 is arranged to pivot about latch pivot axis 100 in a counterclockwise direction along a predetermined path to move motion-blocking latch pin 22 from the locked position to the withdrawn position and to engage friction cam 24 to cause friction cam 24 to pivot in a counterclockwise direction to move friction cam 24 from the engaged position to the disengaged position as suggested in FIGS. 6-11. Cam-pivot post 25 is aligned with latch pivot axis 100 to support friction cam 24 for pivotable movement about latch pivot axis 100 between the engaged and disengaged positions as suggested in FIG. 3.

Friction cam 24 includes a wedge 60 and a finger 62 as suggested in FIGS. 3, 7, and 13. Wedge 60 is formed to include a base-contact surface 28 arranged to engage cam-contact surface 128 included in seat base 16 when friction cam 24 is moved to assume the engaged position as shown in FIG. 13. Finger 62 is cantilevered to wedge 60 and formed to include a downwardly facing latch contact surface 64 arranged to be engaged by motion-blocking latch pin 22 to cause friction cam 24 to pivot from the engaged position to the disengaged position during counterclockwise pivoting movement of swing arm 54 about latch pivot axis 100 associated with movement of motion-blocking latch pin 22 from the locked position to the withdrawn position to withdraw motion-blocking latch pin 22 from pin-receiving slot 122 formed in seat base 16 (e.g., sector plate 110).

Seat-back release manager 20 further includes a cam-return spring 26. Cam-return spring 26 is configured to provide means for yieldably applying a torque to friction cam 24 to maintain base-contact surface 28 of friction cam 24 in frictional contact with cam-contact surface 128 of seat base 16 (e.g., sector plate 110) until motion-blocking latch pin 22 has been moved out of pin-receiving slot 122 formed in seat base 16 to engage finger 62 of friction cam 24 and pivot friction cam 24 on cam-pivot post 25 to disengage base-contact surface 128 of seat base 16. Cam-return spring 26 is configured to provide means for yieldably applying a torque to maintain friction cam 24 in frictional contact with cam-contact surface 128 of seat base 16 without affecting movement of motion-blocking latch pin 22 from the locked position to the withdrawn position.

Seatback-motion controller 10 further includes a latch actuator 19 coupled to the swing arm 54 as suggested in FIG. 3. Latch actuator 19 is configured to include means separate from friction cam 24 for applying an external force to swing arm 54 to (1) cause swing arm 54 to pivot about latch pivot axis 100 to move motion-blocking latch pin 22 from the locked position in pin-receiving slot 122 formed in seat base 16 to the withdrawn position outside pin-receiving slot 122 formed in seat base 16 and then to (2) engage friction cam 24 to cause friction cam 24 to pivot in a counterclockwise direction to move friction cam 24 from the engaged position to the disengaged position.

Foundation 17 is formed to include an interior region 171 containing the friction cam 24 as suggested in FIGS. 3-5. Seat-back lock 18 is located outside of interior region 171 of foundation 17 and adapted to lie between foundation 17 and seat back 14 as suggested in FIGS. 3-5.

Foundation 17 includes an inner shell 42 and an outer shell 44. Inner shell 42 is adapted to be coupled to seat back 14 to pivot therewith. Outer shell 44 is configured to cooperate with inner shell 42 to form an interior space 171 therebetween. Friction cam 24 is located in interior space 171 formed between inner and outer shells 42, 44. Inner shell 42 includes an interior wall arranged to face toward friction cam 24 and an oppositely facing exterior wall arranged to face away from outer shell 42 and toward swing arm 54.

Cam-return spring 26 is located in interior region 171 of foundation 17 and configured to yieldably urge friction cam 24 to pivot in a clockwise direction normally to engage cam-contact surface 128 of seat base 16 (e.g., sector plate 110). Cam-return spring 26 of seat-back release manager 20 is located in interior space 171 formed between inner and outer shells 42, 44 and biased yieldably to engage friction cam 24 to urge friction cam 24 to remain in frictional contact with cam-contact surface 128 included in seat base 16 until friction cam 24 is moved from the engaged position to the disengaged position.

Latch 50 further includes a swing-arm pivot post 56 coupled to inner shell 42 of foundation 17 and arranged to mate with swing arm 54 to establish latch pivot axis 100. Cam-pivot post 25 of seat-back release manager 20 is coupled to outer shell 44 and to swing-arm pivot post 56 as suggested in FIG. 3.

Swing arm 54 is located outside of interior space 171 formed between inner and outer shells 42, 44. A portion of inner shell 42 is arranged to lie between swing arm 54 of latch 50 and friction cam 24.

Foundation 17 is configured to provide means for receiving in interior space 171 formed between inner and outer shells 42, 44 a portion of a sector plate 110 included in seat base 16 and formed to include pin-receiving slot 122 and cam-contact surface 128. A sector-contact surface 28 on friction cam 24 is arranged to establish frictional contact with cam-contact surface 128 of sector plate 110 while friction cam 24 is located in the engaged position.

Swing arm 54 is an L-shaped member and includes a short segment 54S and a relatively longer long segment 54L coupled to short segment 54S as suggested in FIG. 3. Latch 50 further includes a swing-arm pivot post 56 coupled to swing arm 54 at the intersection of short and long segments 54S, 54L and to foundation 17 to support swing arm 54 for pivotable movement about latch pivot axis 100. Motion-blocking latch pin 22 is coupled to a free end of long segment 54L. Seat-back lock 18 further includes a latch-return spring 52 coupled at one end to inner shell 42 of foundation 17 and at an opposite end to a free end of short segment 54S. Latch-return spring 52 is arranged to lie outside of interior space 171 formed between inner and outer shells 42, 44.

Foundation 17 is formed to include a slot 322 (also 422) and motion-blocking latch pin 22 is fixed on swing arm 54 and arranged to extend through and move back and forth in slot 322 (also 422) during pivoting movement of swing arm 54 about latch pivot axis 100. Slot 322 (also 422) is banana-shaped as suggested in FIG. 3.

Latch actuator 19 is coupled to long segment 54L of swing arm 54 and configured to apply an external force to long segment 54L of swing arm 54 to cause swing arm 54 to pivot about latch pivot axis 100 to move motion-blocking latch pin 22 from the locked position in pin-receiving slot 122 formed in seat base 16 to the withdrawn position outside pin-receiving slot 122 formed in seat base 16.

Friction cam 24 includes a base-contact surface 28 arranged to engage cam-contact surface 128 included in seat base 16 when friction cam 14 is located in the engaged position. Base-contact surface 28 of friction cam 24 is curved and defined by a first radius of curvature R1 as suggested in FIG. 15. Cam-contact surface 128 of sector plate 110 is curved and defined by a second radius of curvature R2 as suggested in FIG. 15. Friction cam 24 is characterized by a pressure angle PA that is the measure of an angle formed between a first straight line ray extending between a contact point established between mating portions of a sector-contact surface 28 on friction cam 24 and cam-contact surface 128 on a sector plate 110 included in seat base 16 and a second straight line ray extending from the contact point through both of an origin of the first radius of curvature R1 defining sector-contact surface 128 and an origin of second radius of curvature R2 defining cam-contact surface 28.

The invention claimed is:

1. A seatback-motion controller for mounting on a vehicle seat including a seat base and a seat back mounted for pivotable movement relative to the seat base between an upright use position and a forward-leaning easy-entry position, the seatback-motion controller comprising:
a seat-back lock adapted for locking the seat back to the seat base in the upright use position, the seat-back lock including a latch comprising a pivotable swing arm, a motion-blocking latch pin mounted on the swing arm to pivot therewith, and a latch-return spring configured to apply a force to the swing arm to urge the motion-blocking latch pin into a pin-receiving slot formed in a sector plate included in the seat base to lock the seat back in the upright use position; and
a seat-back release manager comprising a friction cam designed to cooperate with neighboring components to manage ergonomic characteristics associated with operation of the seatback-motion controller, the friction cam being arranged to engage directly with the sector plate included in the seat base to block pivotable movement of the seat back from the upright use position to the forward-leaning easy-entry position and being separated from and independent of the seat-back lock,
wherein the motion-blocking latch pin has a withdrawn position located outside of the pin-receiving slot to disable the seat-back lock and free the seat back for pivotable movement from the upright use position to the forward-leaning easy-entry position.

2. The seatback-motion controller of claim 1, wherein the friction cam blocks pivotable movement of the seat back from the upright use position to the forward-leaning easy-entry position even when the motion-blocking latch pin is in the withdrawn position.

3. The seatback-motion controller of claim 1, wherein the swing arm is arranged to pivot about a latch pivot axis to move the motion-blocking latch pin from a locked position to a withdrawn position and to engage the friction cam to cause the friction cam to move from an engaged position to a disengaged position.

4. The seatback-motion controller of claim 3, wherein the seatback-release manager includes a cam-pivot post aligned with the latch pivot axis to support the friction cam for pivotable movement about the latch pivot axis between the engaged and disengaged positions.

5. The seatback-motion controller of claim 3, wherein the friction cam includes a wedge formed to include a base-contact surface arranged to engage a cam-contact surface included in the seat base when the friction cam is moved to the engaged position and a finger cantilevered to the wedge and formed to include a downwardly facing latch contact surface arranged to be engaged by the motion-blocking latch pin to cause the friction cam to pivot from the engaged position to the disengaged position during pivoting movement of the swing arm about the latch pivot axis associated with movement of the motion-blocking latch pin from the locked position to the withdrawn position to withdraw the motion-blocking latch pin from the pin-receiving slot.

6. The seatback-motion controller of claim 1, wherein the seat-back release manager further includes a cam-return spring configured to yieldably apply a torque to the friction cam to maintain frictional contact between the friction cam and the seat base until the motion-blocking latch pin has been moved out of the pin-receiving slot to engage the friction cam and pivot the friction cam.

7. The seatback-motion controller of claim 1, further comprising a latch actuator coupled to the swing arm and configured to apply an external force to the swing arm to cause the swing arm to pivot to move the motion-blocking latch pin from the pin-receiving slot to a position outside the pin-receiving slot and to engage the friction cam to cause the friction cam to pivot and move from an engaged position to a disengaged position.

8. The seatback-motion controller of claim 1, wherein the swing arm is an L-shaped member and includes a short segment and a relatively longer long segment coupled to the short segment, the latch further includes a swing-arm pivot post coupled to the swing arm at the intersection of the short and long segments to support the swing arm for pivotable movement about a latch pivot axis, the motion-blocking latch pin is coupled to a free end of the long segment, and the latch-return spring is coupled to a free end of the short segment.

9. The seatback-motion controller of claim 8, further comprising a latch actuator coupled to the long segment of the swing arm and configured to apply an external force to the long segment of the swing arm to cause the swing arm to pivot about the latch pivot axis to move the motion-blocking latch pin from the pin-receiving slot to a position outside the pin-receiving slot.

10. The seatback-motion controller of claim 9, wherein the friction cam includes a wedge formed at an inner end thereof to mate with a cam-pivot post of the seatback-release manager, and the friction cam also includes a finger cantilevered to an outer end of the wedge and formed to include a downwardly facing latch contact surface arranged to be engaged by the motion-blocking latch pin to cause the friction cam to pivot from an engaged position to a disengaged position during pivoting movement of the swing arm associated with movement of the motion-blocking latch pin to withdraw the motion-blocking latch pin from the pin-receiving slot.

11. The seatback-motion controller of claim 1, wherein the friction cam includes a base-contact surface arranged to engage a cam-contact surface of the seat base when the friction cam is in an engaged position.

12. The seatback-motion controller of claim 11, wherein the base-contact surface and the cam-contact surface are curved and have radiuses of curvature.

13. The seatback-motion controller of claim 1, wherein the friction cam is made of a press and sintered powdered material.

14. The seatback-motion controller of claim 1, wherein the seat-back release manager further includes a cam-return spring configured to yieldably apply a torque to maintain the friction cam in frictional contact with the seat base without affecting movement of the motion-blocking latch pin from the receiving slot.

15. The seatback-motion controller of claim 1, further comprising a foundation adapted to be coupled to the seat back to pivot therewith relative to the seat base about a seat-back pivot axis, wherein the seat-back lock is coupled to the foundation to move therewith during pivoting movement of the seat back relative to the seat base.

16. The seatback-motion controller of claim 15, wherein the swing arm is arranged to pivot relative to the foundation about a latch pivot axis to move the motion-blocking latch pin relative to the foundation between a locked position in the pin-receiving slot and a withdrawn position located outside of the pin-receiving slot.

17. The seatback-motion controller of claim 16, wherein the seat-back release manager includes a cam-pivot post coupled to the foundation to move therewith, and the friction cam is mounted on the cam-pivot post for pivotable movement between an engaged position establishing frictional contact with the seat base to block pivotable movement of the seat back from the upright use position to the forward-leaning easy-entry position even when the motion-blocking latch pin is in the withdrawn position and a disengaged position disengaging the seat base to free the seat back for pivotable movement from the upright use position to the forward-leaning easy-entry position.

18. The seatback-motion controller of claim 15, wherein the foundation is formed to include an interior region containing the friction cam and the seat-back lock is located outside of the interior region of the foundation.

19. The seatback-motion controller of claim 15, wherein the foundation includes an inner shell adapted to be coupled to the seat back to pivot therewith and an outer shell configured to cooperate with the inner shell to form an interior space therebetween, the friction cam is located in the interior space formed between the inner and outer shells, and the inner shell includes an interior wall arranged to face toward the friction cam and an oppositely facing exterior wall arranged to face away from the outer shell and toward the swing arm.

20. A seatback-motion controller for mounting on a vehicle seat including a seat base and a seat back mounted for pivotable movement relative to the seat base between an upright use position and a forward-leaning easy-entry position, the seatback-motion controller comprising:
  a seat-back lock adapted for locking the seat back to the seat base in the upright use position, the seat-back lock including a latch comprising a pivotable swing arm, a motion-blocking latch pin mounted on the swing arm to pivot therewith, and a latch-return spring configured to apply a force to the swing arm to urge the motion-blocking latch pin into a pin-receiving slot formed in a sector plate included in the seat base to lock the seat back in the upright use position;
  a seat-back release manager comprising a friction cam designed to cooperate with neighboring components to manage ergonomic characteristics associated with operation of the seatback-motion controller, the friction cam being arranged to engage directly with the sector plate included in the seat base to block pivotable movement of the seat back from the upright use position to the forward-leaning easy-entry position and being separated from and independent of the seat-back lock; and a latch actuator coupled to the swing arm and configured to apply an external force to the swing arm to cause the swing arm to pivot to move the motion-blocking latch pin from the pin-receiving slot to a position outside the pin-receiving slot and to engage the friction cam to cause the friction cam to pivot and move from an engaged position to a disengaged position.

21. A seatback-motion controller for mounting on a vehicle seat including a seat base and a seat back mounted for pivotable movement relative to the seat base between an upright use position and a forward-leaning easy-entry position, the seatback-motion controller comprising:

a seat-back lock adapted for locking the seat back to the seat base in the upright use position, the seat-back lock including a latch comprising a pivotable swing arm, a motion-blocking latch pin mounted on the swing arm to pivot therewith, and a latch-return spring configured to apply a force to the swing arm to urge the motion-blocking latch pin into a pin-receiving slot formed in a sector plate included in the seat base to lock the seat back in the upright use position;

a seat-back release manager comprising a friction cam designed to cooperate with neighboring components to manage ergonomic characteristics associated with operation of the seatback-motion controller, the friction cam being arranged to engage directly with the sector plate included in the seat base to block pivotable movement of the seat back from the upright use position to the forward-leaning easy-entry position and being separated from and independent of the seat-back lock; and a foundation adapted to be coupled to the seat back to pivot therewith relative to the seat base about a seat-back pivot axis, wherein the seat-back lock is coupled to the foundation to move therewith during pivoting movement of the seat back relative to the seat base, wherein the swing arm is arranged to pivot relative to the foundation about a latch pivot axis to move the motion-blocking latch pin relative to the foundation between a locked position in the pin-receiving slot and a withdrawn position located outside of the pin-receiving slot.

* * * * *